United States Patent [19]
Bissell

[11] 3,765,249
[45] Oct. 16, 1973

[54] GAUGE CASING CONSTRUCTION
[75] Inventor: Robert D. Bissell, Orange, Conn.
[73] Assignee: Dresser Industries, Inc., Dallas, Tex.
[22] Filed: Sept. 23, 1971
[21] Appl. No.: 183,000

[52] U.S. Cl. ............................... 73/431, 220/82 A
[51] Int. Cl. ......................................... G01d 11/24
[58] Field of Search ................ 73/431; 220/82 A, 220/82 R; 58/90 R

[56] References Cited
UNITED STATES PATENTS
| | | | |
|---|---|---|---|
| 3,187,582 | 6/1965 | Perkins et al. | 73/431 |
| 2,719,403 | 10/1955 | Gisiger | 58/90 R |
| 3,166,941 | 1/1965 | Waite et al. | 73/431 |
| 3,504,551 | 4/1970 | Bohenek | 73/431 |

Primary Examiner—Richard C. Queisser
Assistant Examiner—Daniel M. Yasich
Attorney—Robert W. Mayer et al.

[57] ABSTRACT

A plastic gauge casing formed of separate front and rear cup-like interfitting sections. Concentrically arranged annular skirts on a first section define an annular recess therebetween. In assembly, an annular skirt on the second section is telescopically received in the recess contiguously in an interleaved relation with skirts of the first section. Mutually engageable radial tabs on opposite facing skirts provide an interlock against pullout.

6 Claims, 5 Drawing Figures

PATENTED OCT 16 1973  3,765,249

ROBERT D. BISSELL
INVENTOR

BY Daniel Rubin
ATTORNEY

GAUGE CASING CONSTRUCTION

BACKGROUND OF THE INVENTION

The field of art to which the invention pertains includes the art of gauge instrumentation and in particular to housings or casing therefor.

Casings are widely used to enclose and generally protect working components of the instruments against their service environment. In this capacity, the casing is not instrumentally functional per se but nonetheless represents a significant expense in the overall manufacturing cost of the instrument. With the advent of less expensive plastics, many manufacturers converted from previous metal housings in order to effect a cost reduction of this component. Exemplifying plastic type casings are U.S. Pats. Nos. 3,152,480 and 3,520,192.

While the use of plastics for these purposes had been regarded as fundamentally sound in principle, they have not heretofore proven out as entirely sound in practice. Unfortunately, many of the commonly available plastic resins otherwise suitable for this purpose are thermally sensitive. This causes them to permanently incur plastic flow or dimensional deformation from thermal cycling to which they are subjected in service. As a result of this instability, assembled casing integrity has been somewhat unpredictable in that unwanted separation of the case components has occurred with a high degree of frequency. Moreover, such dimensional instability tends to become increasingly acute with increases in size rendering the larger casing substantially more vulnerable to the problem. At the same time, while other more expensive plastic compositions are available providing greater dimensional stability they too, unfortunately, suffer from their own detrimental characteristics. Typically, the latter incur crazing or the like in the presence of aromatic vapors such as cleaning fluid, gasoline, paint thinner, etc. to which they are commonly exposed in industry. Consequently, plastic casings are not yet regarded as commercially satisfactory for the many industrial applications they are otherwise intended to serve.

SUMMARY

This invention relates to a novel plastic gauge casing. More specifically, the invention relates to a plastic gauge casing constructed in a novel manner capable of maintaining its assembled integrity despite characteristic dimensional instability of the plastic resin selected. By virtue thereof, the importance of dimensional stability in dictating a choice of resin selection is rendered minimal as to enable such choices generally without regard thereto. With that factor essentially eliminated, the remaining factors affecting material choice can be substantially narrowed toward a resin material compatible with the service environment in which the casings are to be installed.

This result is achieved in accordance herewith by a construction in which the individual casing parts are assembled in annular axially interleaved relation providing thin sectioned interfits least subject to instability effects. To the extent that dimensional instability is still present, the interleaved sandwich arrangement ensures continuing integrity of the assembly in whatever radial direction it occurs. Consequently, the previous difficulties associated with plastic casings are substantially eliminated by a relatively simple construction in resolving a long-standing problem of industry.

It is therefore an object of the invention to provide a novel plastic casing construction for a guage instrument.

It is a further object of the invention to provide a novel plastic gauge casing construction that is increasingly insensitive to dimensional instability endured by the plastic composition as to enhance assembled integrity to a substantially greater extent than heretofore.

It is a still further object of the invention to provide a novel gauge casing construction as in the aforementioned objects enabling a wider choice of the resin materials for the service conditions to which the casing is to be subjected.

Figure 1:
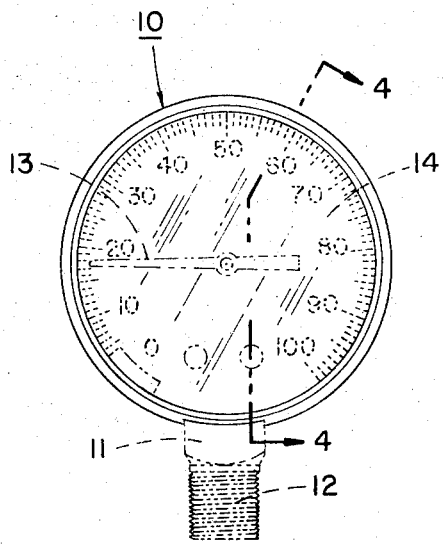
FIG. 1 is a front view of the casing.
Figure 2:
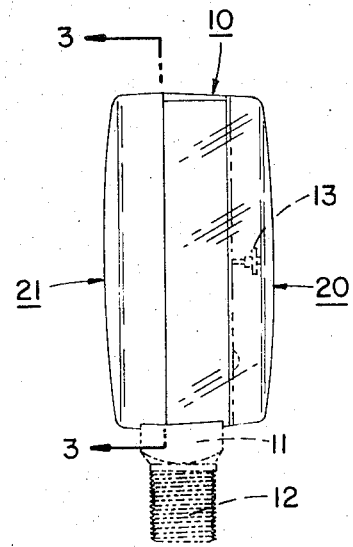
FIG. 2 is a side view of the casing.

Referring now the drawings there is disclosed a casing 10 in accordance herewith as utilized for a pressure gauge. The gauge components are shown in phantom outline including a stem 11 threaded at 12 for connecting to a system with which it is to be utilized. A pointer 13 is operative relative to a dial 14 for indicating current value of system pressures.

Casing 10 is of a moldable plastic composition consisting of a front section 20 and a rear section 21 both of which are generally cylindrically cup-shaped in cross-section. Various resins are commercially available for this purpose. In a preferred embodiment a cellulose acetate butyrate composition is employed for front section 20 because of its high solvent resistance and high degree of transparency for pleasing aesthetic appearance. For rear section 21, polypropylene is generally preferred. Although not generally available in transparent form, it too has high solvent resistance while otherwise characterized by good temperature resistance, good appearance, flexibility and low cost.

Front section 20 is an integrally molded formation consisting generally of the front or top radially extending, slightly convex cover 24 which merges with annular axially extending skirt or sidewall 25. The skirt is substantially encircling except for a cutout 26 sized to accommodate gauge stem 11 for a bottom stem connection. For a rear stem connection, as is well known, cutout 26 is eliminated. At the axially outboard end of skirt 25 its diameter is reduced at shoulder 30 to define an annular groove 31. The groove in turn axially merges with a radially enlarged annular bead or tab 32 otherwise circumferentially coincident with skirt 25.

Rear section 21 is likewise of an integrally molded formation consisting of a backwall 36 merging with an axially extending annular innerskirt or sidewall 37 and an axially extending annular outer skirt or sidewall 38. The skirts are concentric to each other and their circumferential extent is substantially complete except for a cutout 39 complementing stem cutout 26. For a back stem connection, cutout 39 will likewise be eliminated. Also, it should be noted that for reasons as will be understood, skirt 37 has an axial extent greater than skirt 38. Bores 44 and counterbores 45 in reinforced section 46 accommodate screws (not shown) for securing casing 10 to an interior surface of gauge stem 11.

In terms of its dimensional correspondence with section 20, the outer diameter of skirt 37 is substantially the same or slightly less than the inner diameter of skirt 25 to result in an assembled contiguously superposed subtended relation therewith. At the same time the outer diameter of skirt 38 substantially coincides with the outer diameter of skirt 25 to simulate visual continuity therewith while its inner diameter is sufficiently large and spaced from skirt 37 as to define an annular recess 40 therebetween. The axial end of skirt 38 terminates juxtaposed with shoulder 30 whereat it includes a plurality of downwardly depending radially enlarged arcuate beads or tabs 43. The latter beads face radially inward of recess 40 for receipt in groove 31 at angularly displaced locations about the circumference thereof and are generally mirrorlike in cross section to bead 32.

Figure 5:
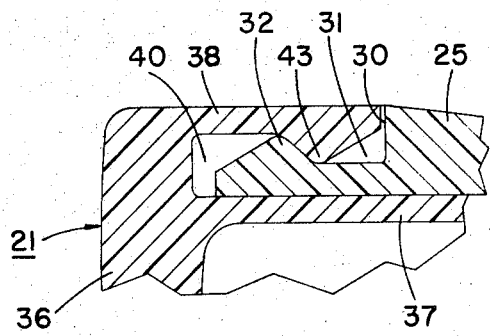
FIG. 5 is a fragmentary enlargement of the encircled portion of FIG. 4.
Figure 4:
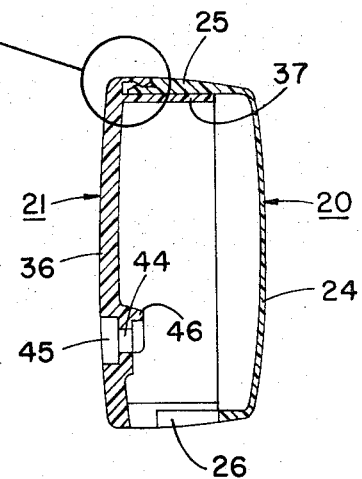
FIG. 4 is a sectional view taken substantially along the lines 4—4 of FIG. 1.
Figure 3:
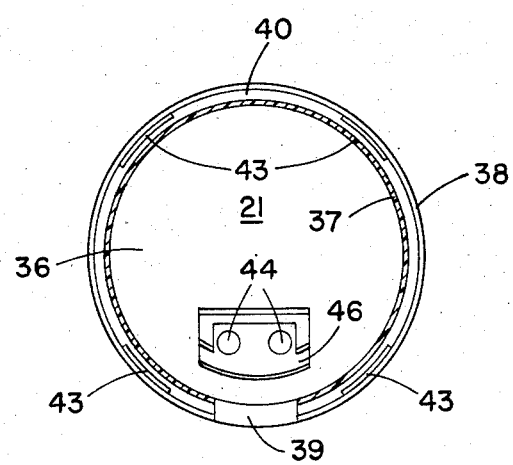
FIG. 3 is a sectional view taken substantially along the lines 3—3 of FIG. 2.

For assembling the front and back sections to form casing 10, the sections need only be placed in their symmetrically overlapping relation and moved axially toward each other. This causes front bead 32 to be advanced inward of recess 40 until rear bead 43 seats in front skirt recess 31. With the components in this arrangement, as shown in FIGS. 4 and 5, the interfit between opposing beads provides an interlock against axial pullout while skirts 25, 37, and 38 radially overlap in an interleaving or sandwiched relation. Moreover, skirt 37 in this relation extends axially inward substantially two-thirds the cavity extent of front section 20 closely subtending skirt 25 for effecting structural stability thereof. By virtue of the closely fit interleaving relation between opposing skirts any dimensional instability radially incurred in either direction will be mutually absorbed by both components as not to adversely affect assembled integrity of the casing.

By the above description there is disclosed a novel but simple, yet highly effective plastic casing construction substantially eliminating the problems of dimensional instability previously associated with such plastic casings in the prior art. Despite the advantages afforded thereby the casing is still capable of easy assembly and intentional disassembly as to otherwise retain the virtues of such plastic construction. At the same time the advantages afforded by this construction do not per se render it more costly than such similar purpose constructions of the prior art on which this feature is unavailable.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. A plastic casing for a gauge instrument comprising in combination:
    a. a molded plastic first cup-like case comprising the front casing section and having an axially extending substantially annular skirt molded integral therewith;
    b. a molded plastic second cup-like case comprising the rear casing section and having a first axially extending substantially annular skirt molded integral therewith, said rear section first skirt being of an outside diameter closely approximating the inner diameter of said front casing skirt to contiguously subtend said front casing skirt in a generally superposed interfit therewith;
    c. said second case also having a second axially extending substantially annular skirt molded integral therewith of axial extent less than the first skirt thereof, said second skirt being concentric with and radially outward of the rear casing first skirt to define an annular recess therebetween in which to receive the axially outboard end of the first front case skirt in interleaving relation therewith; and
    d. arcuate tabs on at least two contiguous skirts of said front section and of said second section in said interleaving relation providing a mutually overlapping interlock therebetween against pullout.

2. A plastic casing for a gauge instrument according to claim 1 in which the arcuate tab on at least one of said cases is of a terminal arcuate length and comprises one of a plurality of similar tabs angularly displaced about its supporting skirt.

3. A plastic casing for a gauge instrument according to claim 1 in which said arcuate tabs are located at substantially the ends of their respective supporting skirts.

4. A plastic casing for a guage instrument according to claim 1 in which said arcuate tabs are located at substantially the ends of the skirt on said first case and the second skirt of said second case and said first case skirt includes an annular recess preceding its terminal outboard end in which to receive a tab of said second skirt radially overlapping the tab thereof for effecting said interlock.

5. A plastic casing for a gauge instrument according to claim 4 in which the arcuate tab on at least one of said cases is of a terminal arcuate length and comprises one of a plurality of similar tabs angularly displaced about its supporting skirt.

6. A plastic casing for a gauge instrument according to clam 5 in which said plurality of tabs are contained on said second case.

* * * * *